United States Patent [19]

Mayer et al.

[11] Patent Number: 5,676,352

[45] Date of Patent: Oct. 14, 1997

[54] VIBRATION ABSORBER WITH MOUNT

[75] Inventors: Thomas Mayer, Sindelfingen; Josef Bartl, Biberg/Tuntenhausen; Klaus Ermert, Grasbrunn, all of Germany

[73] Assignee: Daimler-Benz Aerospace AG, Germany

[21] Appl. No.: 566,307

[22] Filed: Dec. 1, 1995

[30] Foreign Application Priority Data

Dec. 1, 1994 [DE] Germany .................. 44 42 779.4

[51] Int. Cl.$^6$ .................................................. B60B 17/00
[52] U.S. Cl. ...................... 267/140.4; 267/294; 301/6.91
[58] Field of Search ............... 267/37.1, 292–294, 267/136, 140.11, 140.13, 140.4, 141.1; 295/11, 7, 31.1; 301/6.91; 188/378, 218 A

[56] References Cited

U.S. PATENT DOCUMENTS

| | | | |
|---|---|---|---|
| 4,017,123 | 4/1977 | Horner et al. | 301/6.91 |
| 4,353,586 | 10/1982 | Raquet et al. | 301/6.91 X |
| 4,355,578 | 10/1982 | Raquet | 295/11 X |
| 4,405,032 | 9/1983 | Welschof et al. | 301/6.91 X |

FOREIGN PATENT DOCUMENTS

| | | |
|---|---|---|
| 0 047 385 | 3/1982 | European Pat. Off. . |
| 31 13 268 | 10/1982 | Germany . |
| 31 20 068 | 12/1982 | Germany . |
| 33 16 759 | 10/1984 | Germany . |
| 26167 | 10/1906 | United Kingdom .................. 267/292 |

*Primary Examiner*—Peter M. Poon
*Attorney, Agent, or Firm*—Evenson, McKeown, Edwards & Lenahan P.L.L.C.

[57] ABSTRACT

The vibration absorbers have mounts for radial fastening of the vibration absorber to an inside surface of a wheel rim to be used on rails. A plurality of mounts are uniformly distributed over the circumference of the inside surface and are each coupleable to the wheel rim in an acoustically good conducting manner against a surface that matches the radius of curvature of the inside surface. On each mount at least one vibration absorber consisting of a sequence, running in the radial direction, of metal and plastic plates can be coupled in an acoustically effective manner by means of a coupling surface. The vibration absorbers and mount are releasably connected with one another and have a coupling surface that is always the same and is independent of the radius of curvature of the inside surface of the wheel rim.

10 Claims, 5 Drawing Sheets

5,676,352

VIBRATION ABSORBER WITH MOUNT

BACKGROUND AND SUMMARY OF THE INVENTION

The invention relates to a vibration absorber having a mount for radially fastening it to the inner surface of a rail wheel rim.

A vibration absorber and mounting of this kind are disclosed in German Patent Document DE 33 16 759 C1 wherein individual vibration absorbers are fastened to the segments of a ring fitted into the inside circumference of the wheel rim. The absorbers consist of a series of layers of metal and plastic plates and have the same curvature as the ring segments, to which they are riveted. The manufacture of such laminated and curved vibration absorbers is relatively problematic, however, since only a slight difference in curvature of the individual metal plates substantially distorts the uniform distribution of force over the intervening plastic damping plates, so that the desired spectral characteristic of the absorber is no longer ensured. Consequently, the individual plates must be curved very carefully, a comparatively costly and tedious process. In addition, a matched set of mounts as well as absorbers must be produced for each wheel diameter, making stocking and purchasing spare parts expensive.

The object of the present invention is therefore to provide a vibration absorber with a mount for a wheel, which is economical to manufacture, and is readily mountable on wheels of different diameters.

This goal is achieved by the vibration absorber according to the invention, in which a plurality of mounts are distributed uniformly over the circumference of the inner surface of the wheel rim and coupleable to it with good acoustic conduction by a surface which matches the radius of curvature of the inner surface, of the rim. An inner surface of the mount, on the other hand, is substantially flat (although other configurations are possible), and at least one vibration absorber consisting of a series of layers of metal and plastic plates extends in the radial direction in an acoustically effective manner by means of a coupling surface at each mount.

In the system according to the invention, provided with of a vibration absorber having a mount designed as an adapter, a given type of absorber (that is, one whose shape and dimensions do not vary) can be used for a wide variety of wheel diameters, since only the mount itself needs to be matched with the wheel diameter. This arrangement simplifies the manufacture of the laminated absorber, since it can be made with simple flat metal and plastic plates. Likewise, the dimensioning of the plates is no longer influenced by the wheel diameter since a uniform distribution of absorbers over the circumference of the inside surface of the wheel rim can also be provided by the mounts. This is accomplished most simply by coupling the inner surfaces of the adjacent mounts (FIG. 2) for a wheel in the form of a regular polygon. Each mount can be made in the form of a polygon segment, with a plurality of coupling surfaces located side by side for a corresponding number of vibration absorbers. The mounts can also be made in the form of a one-piece ring that is shrunk into the inside surface of the wheel tire; the interior of the ring is then made in the shape of a polygon whose divisions form a whole number multiple of a coupling surface (width) of an absorber.

Other objects, advantages and novel features of the present invention will become apparent from the following detailed description of the invention when considered in conjunction with the accompanying drawings.

DETAILED DESCRIPTION OF THE DRAWING

Figure 1:
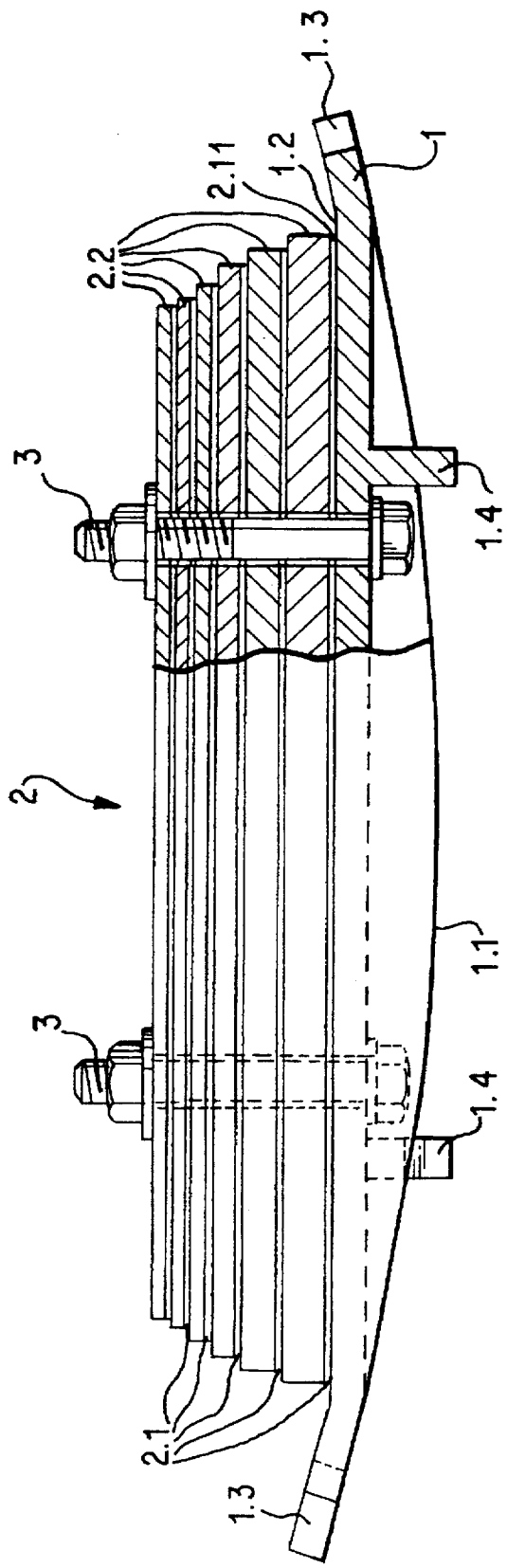
FIG. 1 is a side view or cross section through a vibration absorber with mount.
Figure 1A:
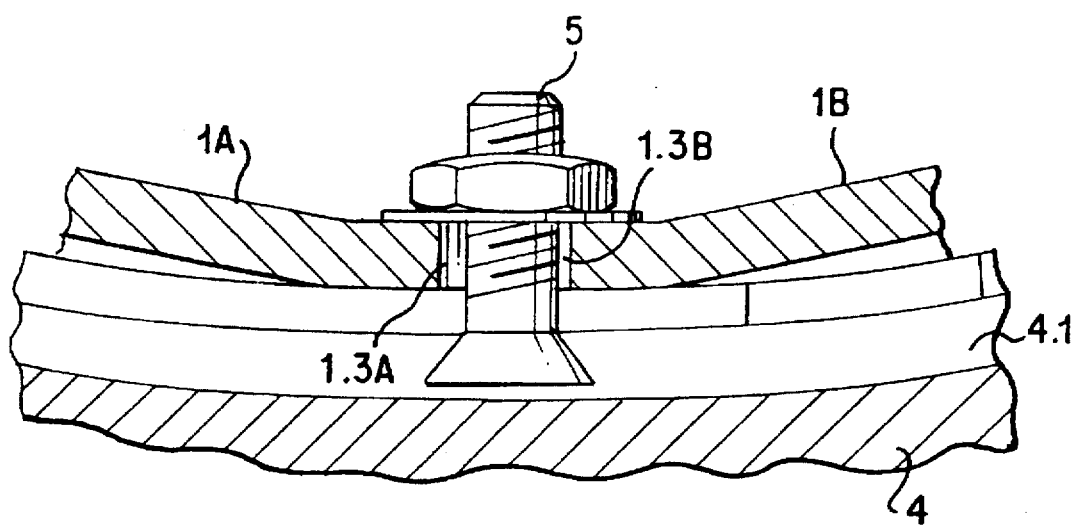
FIG. 1A is an enlarged sectional view which shows the manner of mounting the absorber mount on a wheel rim.
Figure 2:
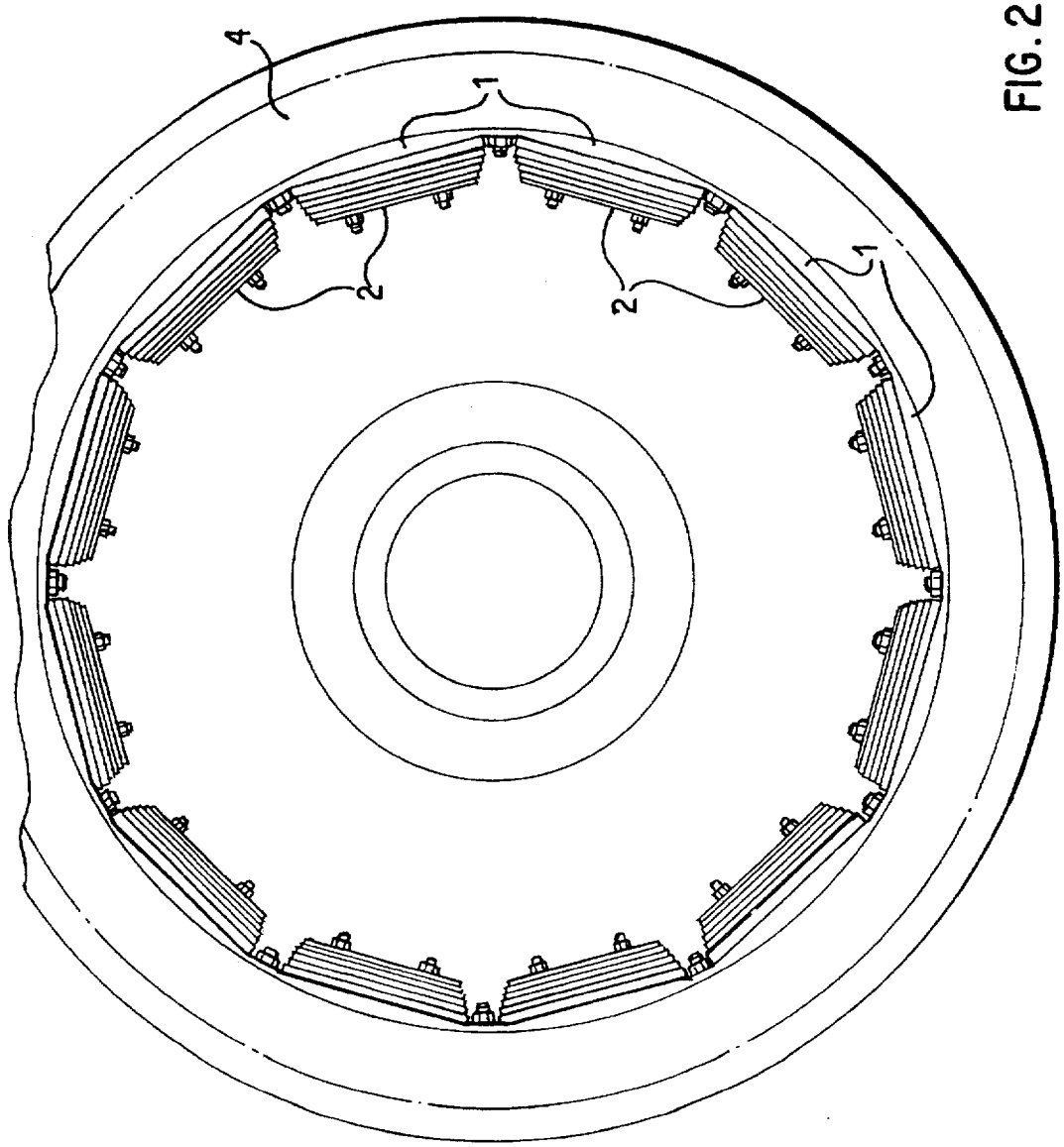
FIG. 2 is a side view of a wheel with vibration absorbers.

The mount 1 shown in FIG. 1, with a vibration absorber 2 that can be screwed on, has an outside surface 1.1 in the shape of a cylinder segment whose radius of curvature exactly matches the inside radius of the wheel rim provided. The mount is positively connected by this surface by means of two screws (not shown), to the wheel rim at the half-open elongated holes 1.3 located at the ends, e.g., by means of a known fastening technique such as is shown in FIGS. 1a and 2, using a groove 4.1 in a wheel rim 4. Then two adjacent mounts 1A and 1B are fastened to the wheel rim by each screw connection 5. Two projections 1.4 also extend into the groove 4.1 of the rim, serving for alignment and axial mounting. Opposite the cylindrical surface 1.1 on the surface 1.2, which is preferably flat, a vibration absorber composed in laminar fashion of flat plastic plates 2.1 and metal plates 2.2, such as disclosed for example in German Patent Document DE 31 13 268 A1, is fastened by means of two screws 3. Absorber 2 is coupled to mount 1 in an acoustically damping manner by the first plastic plate 2.11 which in this case forms the coupling surface of the absorber.

As shown in FIG. 2, the vibration absorbers according to FIG. 1 are held by means of their mounts, side by side with no gaps between them, on the inner circumference of a wheel rim 4. For a wheel with a different diameter it is sufficient merely to use suitably adapted mounts 1. The vibration absorbers 2 themselves are identical, with only the number that can be distributed around the circumference depending upon the wheel diameter. To protect against the consequences of breakage of the screws by which the absorber is fastened to the wheel, tab washers (not shown) may be provided, one each between two absorbers on screws 3 in FIG. 1.

Figure 3:
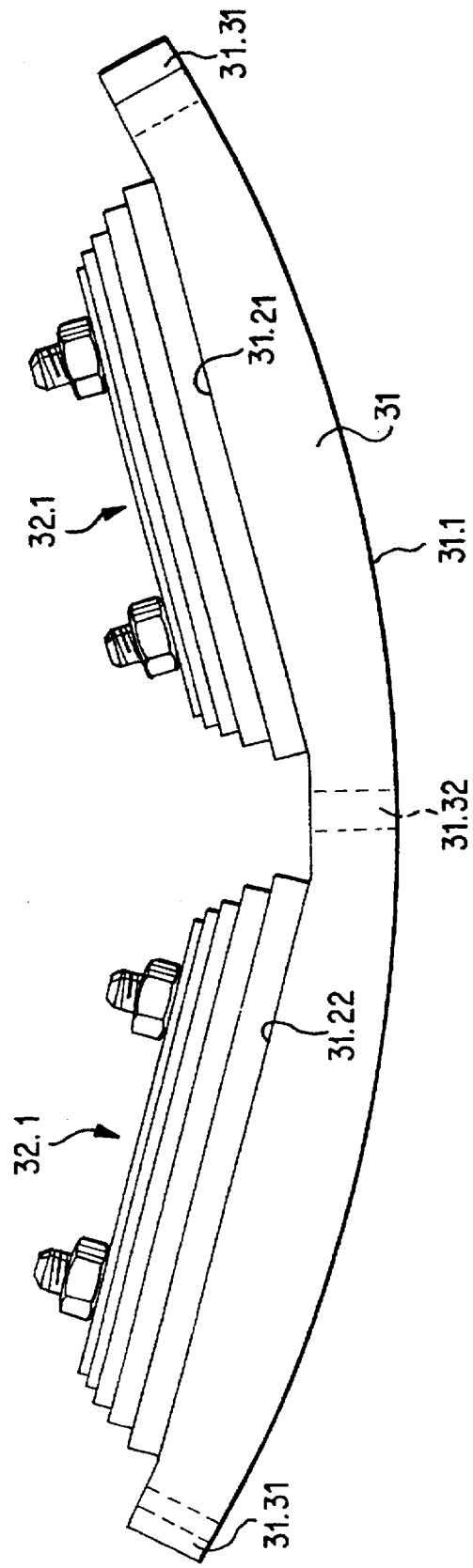
FIG. 3 is a side view of a mount for two vibration absorbers.

FIG. 3 shows a mount 31 once again having a cylindrically curved outer surface 31.1 and therefore likewise forming a segment of a circle. The opposite surface has two flat surface elements 31.21 and 31.22 inclined toward one another, on which identical vibration absorbers 32.1 and 32.2 are screwed. Mount 31 is fastened by analogy with FIG. 1 at the outer edges by two screw fastenings, not shown, in half-open elongated holes 31.31 and in the middle by a hole 31.32 with the wheel rim.

Figure 4:
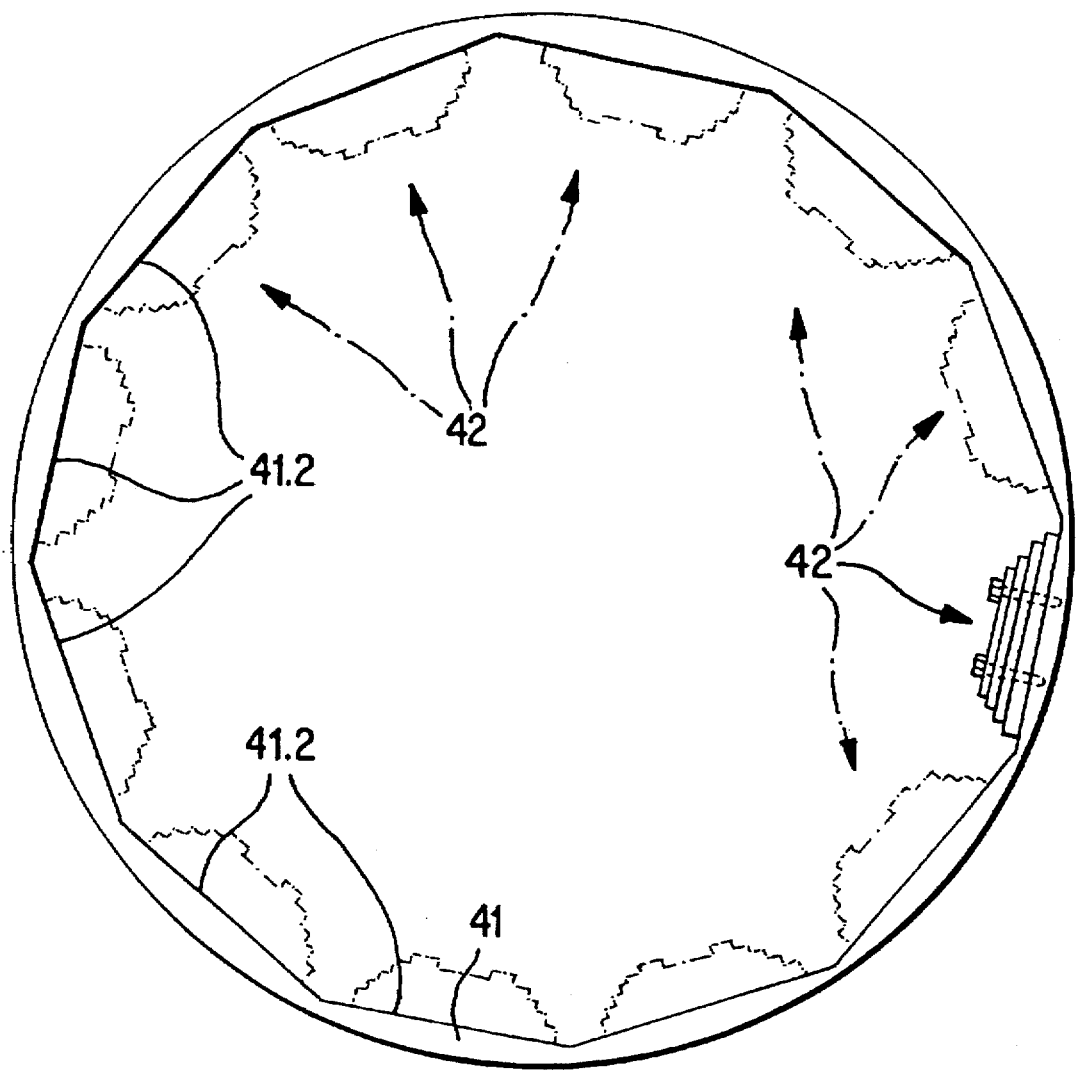
FIG. 4 is a ring-shaped mount with polygonal inside surface.

FIG. 4 shows a ring-shaped mount 41 that is shrinkable into the inside surface or into a groove of an inside surface of a wheel rim in a manner which is known per se. The inside of the ring has flat surfaces 41.2 arranged in the manner of a polygon, to which the vibration absorber 42 can be screwed. For different wheel diameters, different wheel mounts 41 are simply used, to which the vibration absorbers 42 (whose dimensions and shape are always the same), can be screwed, with only the maximum number that can be mounted on the circumference being different. The absence of mounting screws makes this type of mount especially weight-saving.

Since the absorbers, and hence their base surfaces are always the same, plates with shapes other than flat could theoretically also be used to form the laminations in the absorber.

Since the screws used to fasten the mounts to the wheel are different from those used for fastening the absorbers, different tightening torques can be used for both fastenings and hence the absorbers can be tuned individually with constant acoustic coupling to the wheel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vibration absorbing arrangement for a rail wheel, comprising:

at least one mount having an arcuate outside surface with a radius of curvature which matches a radius of curvature of an inside surface of a wheel rim of said rail wheel, said at least one mount being mounted on said inside surface of said wheel rim; and said at least one mount having at least one inside coupling surface opposite said outside surface, and at least one vibration absorber acoustically and mechanically coupled to said at least one inside coupling surface, said at least one vibration absorber comprising a sequence of metal and plastic plates which are stacked in a radial direction relative to said wheel rim;

said at least one vibration absorber being releasably connected to said at least one mount, and said at least one inside coupling surface of said at least one mount having a contour which is different from a contour of the inside surface of the wheel rim.

2. Vibration absorbing arrangement according to claim 1 comprising a plurality of mounts wherein coupling surfaces of said plurality of mounts form a regular polygon.

3. Vibration absorbing arrangement according to claim 1, wherein said at least one mount has a plurality of coupling surfaces.

4. Vibration absorbing arrangement according to claim 3, wherein said at least one mount comprises a shrink ring.

5. Vibration absorbing arrangement according to claim 3, wherein said at least one vibration absorber is coupled to said mount by an elastic layer.

6. Vibration absorbing arrangement according to claim 1, wherein said at least one vibration absorber is coupled to said at least one mount by an elastic layer.

7. Vibration absorbing arrangement according to claim 1, wherein said inside coupling surface is substantially planar.

8. Vibration absorbing element according to claim 1 wherein said at least one inside coupling surface of said at least one mount has a radius of curvature substantially greater than the radius of curvature of the inside surface of the wheel rim.

9. Vibration absorbing element according to claim 8 wherein said at least one coupling surface of said mount has a radius of curvature which is infinite.

10. Method of damping vibrations in a rail wheel comprising the steps of:

providing at least one vibration absorbing element having predetermined dimensions and having a coupling surface with a predetermined contour, which contour is different from a contour of an inside surface of a wheel rim of said rail wheel;

providing at least one mount having an outside surface which has a contour congruent with the inside surface of said wheel rim, and having an inside coupling surface congruent with said coupling surface of said vibration absorbing element;

acoustically and mechanically coupling said coupling surface of said vibration absorbing element with said coupling surface of said mount; and acoustically and mechanically coupling said outside surface of said mount to said inside surface of said wheel rim.

* * * * *